(12) United States Patent
Chen et al.

(10) Patent No.: US 12,435,045 B2
(45) Date of Patent: Oct. 7, 2025

(54) TYROSINE KINASE INHIBITORS AND PHARMACEUTICAL APPLICATION THEREOF

(71) Applicant: JIANGSU CONCORD BIOTECHNOLOGY CO., LTD, Zhenjiang (CN)

(72) Inventors: Huabiao Chen, Zhenjiang (CN); Zhengyu Long, Zhenjiang (CN); Tao Li, Zhenjiang (CN)

(73) Assignee: JIANGSU CONCORD BIOTECHNOLOGY CO., LTD, Zhenjiang (CN)

( * ) Notice: Subject to any disclaimer, the term of this patent is extended or adjusted under 35 U.S.C. 154(b) by 359 days.

(21) Appl. No.: 17/944,395

(22) Filed: Sep. 14, 2022

(65) Prior Publication Data

US 2023/0043449 A1 Feb. 9, 2023

Related U.S. Application Data

(63) Continuation of application No. PCT/CN2022/078934, filed on Mar. 3, 2022.

(30) Foreign Application Priority Data

Mar. 4, 2021 (CN) .......................... 202110237399.5
Mar. 2, 2022 (CN) .......................... 202210197875.X

(51) Int. Cl.
C07D 239/86 (2006.01)

(52) U.S. Cl.
CPC .................................. C07D 239/86 (2013.01)

(58) Field of Classification Search
CPC .................................................. C07D 239/86
See application file for complete search history.

(56) References Cited

U.S. PATENT DOCUMENTS 9,586,939 B2 * 3/2017 Wu .................... C07D 493/08
9,714,235 B2 * 7/2017 Wang .................. C07D 403/12

FOREIGN PATENT DOCUMENTS

| CN | 102382106 A | 3/2012 |
| CN | 102898386 A | 1/2013 |
| CN | 104910140 A | 9/2015 |
| CN | 105646375 A | 6/2016 |
| CN | 108779079 A | 11/2018 |
| CN | 112334460 A | 2/2021 |
| CN | 113264888 A | 8/2021 |

OTHER PUBLICATIONS

Li et al (2010) : STN International, CAPLUS database, Accession No. 2010 : 1516746.*

Wang et al (2015) : STN International, CAPLUS database, Accession No. 2015 : 117527.*

(Continued)

*Primary Examiner* — Golam M Shameem

(74) *Attorney, Agent, or Firm* — ANOVA LAW GROUP, PLLC

(57) ABSTRACT

The present disclosure provides a tyrosine kinase inhibitor having the general formula (I).

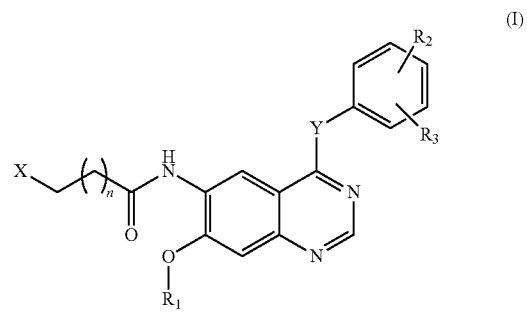

R1 is $C_1$-$C_6$ alkyl, alkenyl, substituted alkenyl, alkynyl, substituted alkynyl, phenyl, mono-substituted phenyl, poly-substituted phenyl, trifluoromethyl, 2,2,2-trifluoroethyl, $CH_3O(CH_2)n$-,

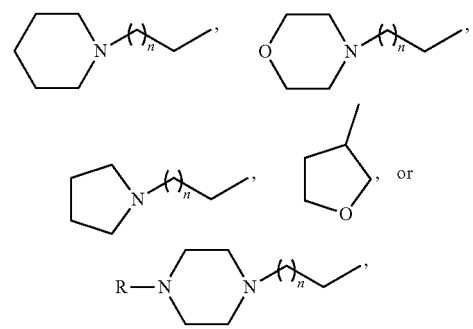

R being methyl, ethyl, isopropyl, trifluoromethyl, 2,2,2-trifluoroethyl, cyclopropyl, acetyl or acryloyl, and n being an integer from 1 to 6. R2 and R3 are respectively halogen, hydrogen, amino, substituted amino, cyano, hydroxyl, sulfonic acid group, sulfonamide, trifluoromethyl, 2,2,2-trifluoroethyl, methyl, methoxy or ethynyl. R2 and R3 are in an ortho, para or meta position. Y is NH, O, S or Z—N, where Z is methyl, ethyl, isopropyl, trifluoromethyl, 2,2,2-trifluoroethyl or cyclopropyl. X is Cl, Br or F.

4 Claims, 2 Drawing Sheets

(56) References Cited

OTHER PUBLICATIONS

Riccardo Castelli, et al., "Balancing reactivity and antitumor activity: heteroarylthioacetamide derivatives as potent and time-dependent inhibitors of EGFR", Dec. 31, 2019, European Journal of Medicinal Chemistry 162(2019) 507-524.
The World Intellectual Property Organization (WIPO) International Search Report for PCT/CN2022/078934 Apr. 28, 2022 7 Pages (with translation).
Castelli. R. et al. "Balancing Reactivity and Antitumor Activity: Heteroarylthioacetamide 1-3 Derivatives as Potent and Time-dependent Inhibitors of EGFR", European Journal of Medicinal Chemistry, vol. 162, Nov. 13, 2018 (Nov. 13, 2018), ISSN: 0223-5234,pp. 507-524.
Smaill. J.B. et al. "Tyrosine Kinase Inhibitors. 20. Optimization of Substituted Quinazoline and Pyrido [3, 4-d]pyrimidine Derivatives as Orally Active, Irreversible Inhibitors of the Epidermal Growth Factor Receptor Family", J. Med. Chem., vol. 59, Aug. 4, 2016 (Aug. 4, 2016), ISSN: 0022-2623, pp. 8103-8124.

\* cited by examiner

TYROSINE KINASE INHIBITORS AND PHARMACEUTICAL APPLICATION THEREOF

CROSS-REFERENCES TO RELATED APPLICATIONS

This application is a continuation application of PCT Patent Application No. PCT/CN2022/078934, filed on Mar. 3, 2022, which claims priority to Chinese Patent Application No. 202110237399.5, filed on Mar. 4, 2021, and Chinese Patent Application No. 202210197875.X, filed on Mar. 2, 2022, the entire contents of all of which are incorporated herein by reference.

FIELD OF THE DISCLOSURE

The present disclosure relates to a tyrosine kinase inhibitor and applications thereof in preparing therapeutic drugs for inhibiting and treating diseases caused by overexpression of tyrosine kinase.

BACKGROUND

Many signaling pathway systems exist in cells, and they interact to control cell proliferation, growth, metastasis and apoptosis. Tyrosine kinase plays a key role in signal transduction: the activity of tyrosine kinase can be activated when a human epidermal growth factor (EGF) binds with an epidermal growth factor receptor (EGFR), resulting in overexpression of the EGF in multiple human solid tumors, and causing uncontrollable cell division. Tyrosine Kinase Inhibitors (TKI) can inhibit and control the activity of tyrosine kinase and control cell proliferation. The mechanism of action of the TKIs is to compete with adenosine triphosphate (ATP) for the ATP binding pocket. Compared with existing cytotoxic anticancer drugs, TKIs feature high selectivity and fewer adverse effects. TKIs have demonstrated superiority in treatment of many diseases, such as chronic myeloid leukemia (CML), gastrointestinal stromal tumor (GIST), non-small cell lung cancer (NSCLC), hepatocellular carcinoma (HCC) and renal cell cancer (RCC).

At present, multiple EGFR tyrosine kinase inhibitors have been developed as anti-tumor drugs. Gefitinib and erlotinib, as the first generation of TKIs, have good curative effect on recurrent and advanced NSCLC. They belong to aniline quinazoline compounds and mainly act on EGFRs. However, the first generation of TKIs all work in a way of reversible inhibition (hydrogen bond formation), so generally speaking, the selectivity is not good enough, the efficacy is not strong and durable enough, and it is easy to cause drug resistance. The existence of drug resistance is a huge clinical challenge, and after a period of remission, disease progression reoccurs to almost all patients with effective treatment.

The disclosed methods and applications are directed to solve one or more problems set forth above and other problems.

SUMMARY

One aspect of the present disclosure provides a tyrosine kinase inhibitor, which is a quinazoline derivative having the general formula (I).

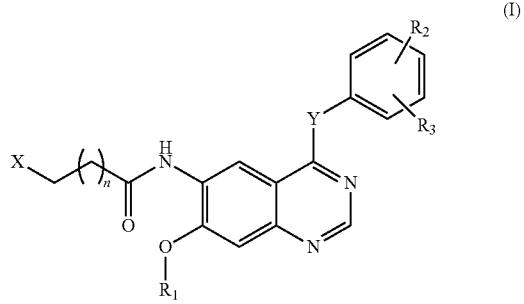

R1 is $C_1$-$C_6$ alkyl, alkenyl, substituted alkenyl, alkynyl, substituted alkynyl, phenyl, mono-substituted phenyl, poly-substituted phenyl, trifluoromethyl, 2,2,2-trifluoroethyl, $CH_3O(CH_2)n$-,

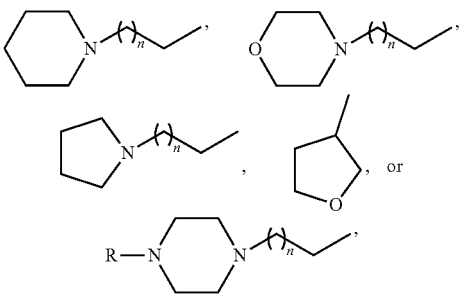

R being methyl, ethyl, isopropyl, trifluoromethyl, 2,2,2-trifluoroethyl, cyclopropyl, acetyl or acryloyl, and n being an integer from 1 to 6. R2 and R3 are respectively halogen, hydrogen, amino, substituted amino, cyano, hydroxyl, sulfonic acid group, sulfonamide, trifluoromethyl, 2,2,2-trifluoroethyl, methyl, methoxy or ethynyl. R2 and R3 are in an ortho, para or meta position. Y is NH, O, S or Z—N, where Z is methyl, ethyl, isopropyl, trifluoromethyl, 2,2,2-trifluoroethyl or cyclopropyl. X is Cl, Br or F.

Another aspect of the present disclosure provides an application of the above-described TKI in preparation of drugs for inhibiting and treating diseases caused by overexpression of tyrosine kinase.

Another aspect of the present disclosure provides a pharmaceutical composition including a tyrosine kinase inhibitor as described above as an active ingredient, and one or more pharmaceutical carriers or excipients.

The disclosed TKI can irreversibly inhibit the activity of tyrosine kinase, as well as inhibit and treat diseases caused by overexpression of the tyrosine kinase. For example, a functional group containing $XCH_2(CH_2)nC=O$ (where X represents a halogen atom, and n represents an integer from 0 to 6) is introduced to a quinazoline structure. The functional group tends to bond to a naked sulfhydryl group of a cysteine near an ATP binding domain of a tyrosine kinase through a nucleophilic reaction to form a covalent bond, thereby irreversibly inhibiting the activity of the tyrosine kinase. Compared to gefitinib which does not bond to the sulfhydryl group of the cysteine and only provides reversible inhibition, the disclosed TKI can irreversibly inhibit the activity of the tyrosine kinase.

Other aspects of the present disclosure can be understood by those skilled in the art in light of the description, the claims, and the drawings of the present disclosure.

BRIEF DESCRIPTION OF THE DRAWINGS

The embodiments are shown and clarified with reference to the drawings. These drawings serve to clarify the basic principle, so that only aspects necessary for understanding the basic principle are shown. The drawings are not to scale. In the drawings, the same reference numerals indicate similar features.

Figure 1:
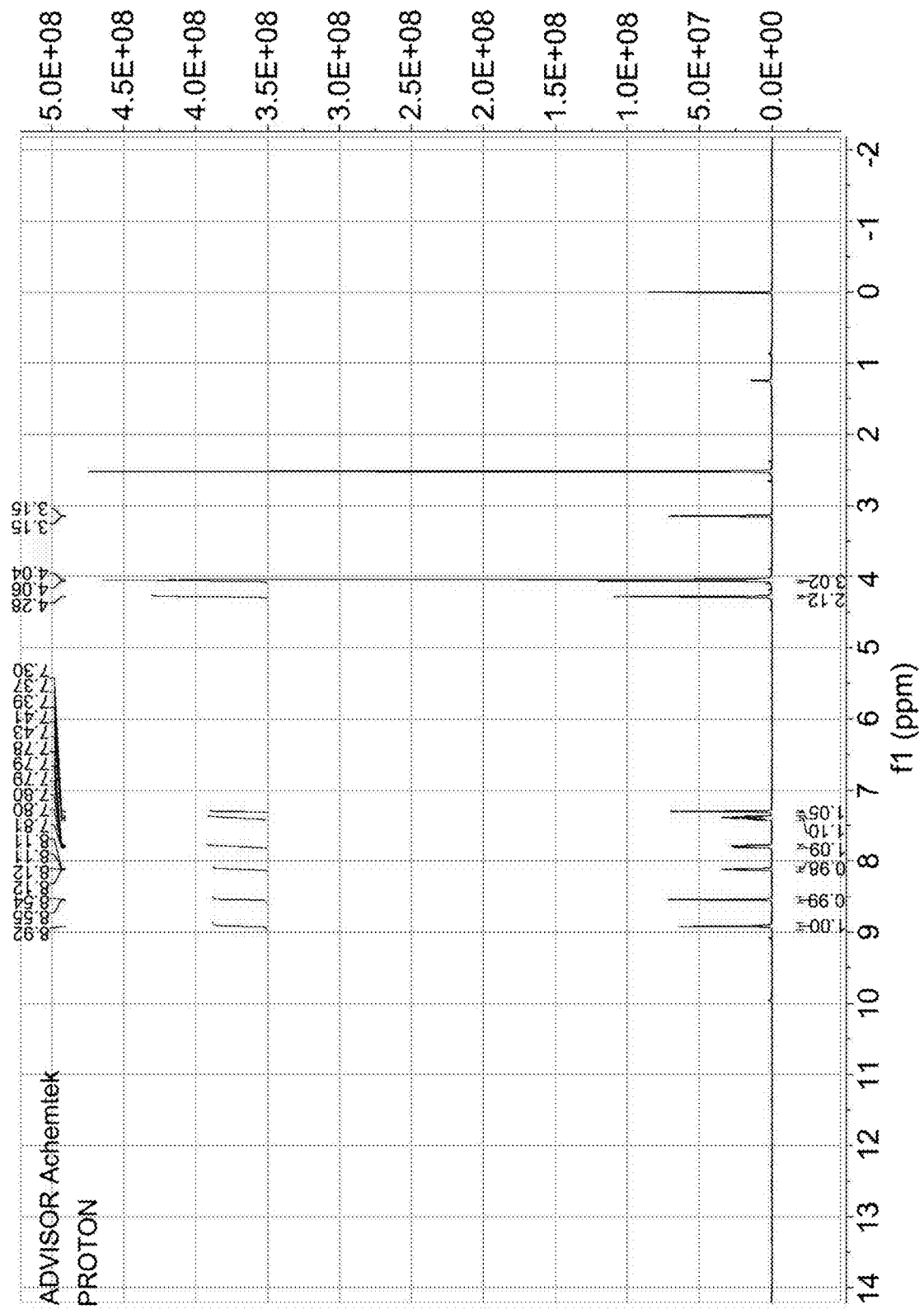
FIG. 1 shows an H-NMR spectrum of a compound prepared according to Example 1.

Other features, characteristics, advantages and benefits of the present disclosure will become more apparent through the following detailed description in conjunction with the accompanying drawings.

DETAILED DESCRIPTION

In the following detailed description of the preferred embodiments, reference will be made to the accompanying drawings constituting a part of the present disclosure. The drawings show specific embodiments capable of implementing the present disclosure by way of example. The exemplary embodiments are not intended to be exhaustive of all embodiments according to the present disclosure. It can be understood that other embodiments can be utilized, and structural or logical modifications can also be made without departing from the scope of the present disclosure. Therefore, the following detailed description is not restrictive, and the scope of the present disclosure is defined by the appended claims.

The present disclosure provides a tyrosine kinase inhibitor (TKI) and applications thereof. The disclosed TKI can be a quinazoline derivative, and can irreversibly inhibit the activity of tyrosine kinase, as well as inhibit and treat diseases caused by overexpression of the tyrosine kinase.

In one example embodiment, a basic reaction process for preparing the quinazoline derivative is shown below:

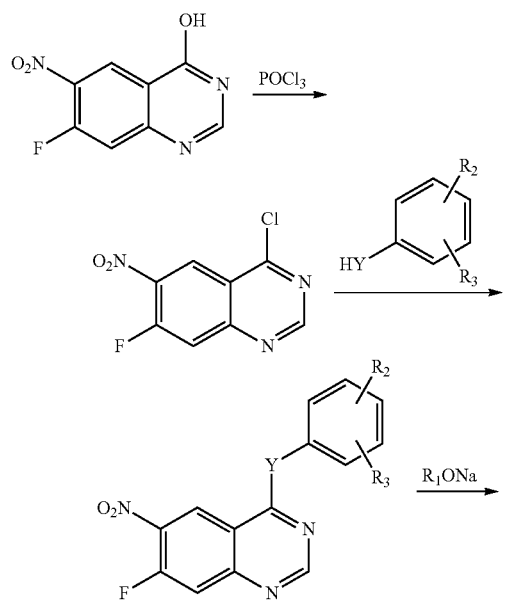

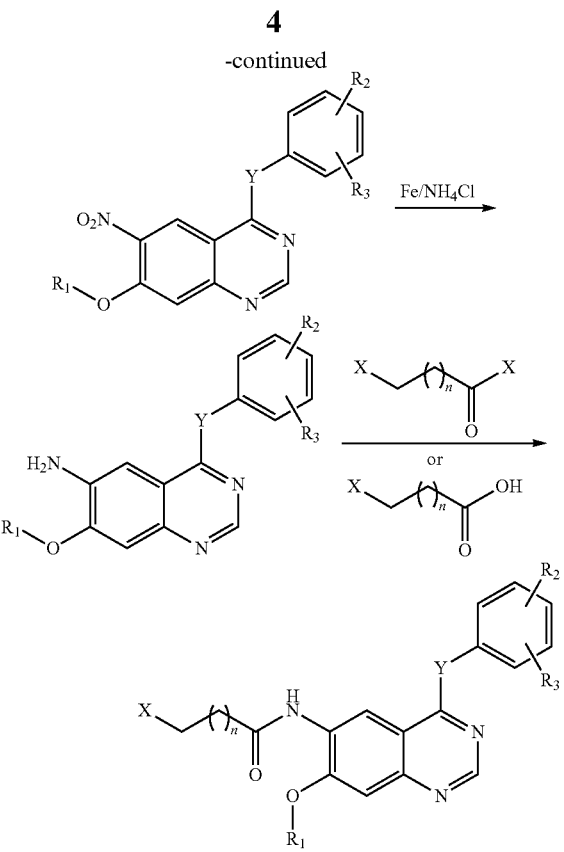

Concepts of the present disclosure are further explained below according to examples below.

The present disclosure provides a tyrosine kinase inhibitor, which is a quinazoline derivative having the general formula (I).

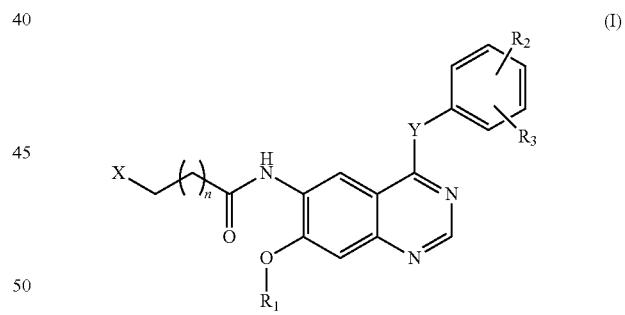

R1 is $C_1$-$C_6$ alkyl, alkenyl, substituted alkenyl, alkynyl, substituted alkynyl, phenyl, mono-substituted phenyl, poly-substituted phenyl, trifluoromethyl, 2,2,2-trifluoroethyl, $CH_3O(CH_2)n$-,

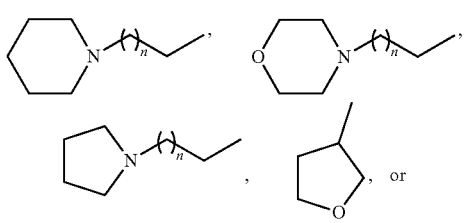

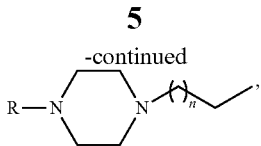

R being methyl, ethyl, isopropyl, trifluoromethyl, 2,2,2-trifluoroethyl, cyclopropyl, acetyl or acryloyl, and n being an integer from 1 to 6. R2 and R3 are respectively halogen, hydrogen, amino, substituted amino, cyano, hydroxyl, sulfonic acid group, sulfonamide, trifluoromethyl, 2,2,2-trifluoroethyl, methyl, methoxy or ethynyl. R2 and R3 are in an ortho, para or meta position. Y is NH, O, S or Z—N, where Z is methyl, ethyl, isopropyl, trifluoromethyl, 2,2,2-trifluoroethyl or cyclopropyl. X is Cl, Br or F.

Example 1

The disclosed tyrosine kinase inhibitor in this example is 4-((4-fluoro-3-chlorophenyl)amino)-7-methoxy-6-((N-bromoacetyl)amino)quinazoline, which can be prepared based on the following steps. In this example, R1 is methyl, R2 is F, R3 is Cl, Y is NH, X is Br. and n=0 in formula (I).

(1) Preparation of 4-Chloro-7-Fluoro-6-Nitroquinazoline

4-Hydroxy-7-fluoro-6-nitroquinazoline (8.5 g) and phosphorus oxychloride (150 ml) were added to a 250 ml round-bottomed flask, and the mixture was stirring under reflux for 6 hours. Excessive phosphorus oxychloride was removed by rotary evaporation, and then the mixture was washed with 10:1 petroleum ether/ethyl acetate to obtain 4-chloro-7-fluoro-6-nitroquinazoline (8.0 g). MS (m/z): 227.78 (M+1)$^+$.

(2) Preparation of 4-((4-Fluoro-3-Chlorophenyl) Amino)-7-Fluoro-6-Nitroquinazoline To 4-chloro-7-fluoro-6-nitroquinazoline (2.3 g) in N,N-dimethylformamide (30 ml), were added 4-fluoro-3-chloroaniline (1.6 g) and potassium carbonate (1.7 g). The mixture was stirred at 50° C. for 10 hours. Then the solvent was distilled under reduced pressure. Ethyl acetate (100 ml) was added, the mixture was washed with water (30 ml). Ethyl acetate was separated and dried over magnesium sulfate. After the mixture was filtrated and concentrated, the residue was purified by chromatography column (dichloromethane/methanol as eluent) to obtain 3.0 g of 4-((4-fluoro-3-chlorophenyl)amino)-7-fluoro-6-nitroquinazoline, MS (m/z): 336.80 (M+1)$^+$.

(3) Preparation of 4-((4-Fluoro-3-Chlorophenyl) Amino)-7-Methoxy-6-Nitroquinazoline To 4-((4-fluoro-3-chlorophenyl)amino)-7-fluoro-6-nitroquinazoline (3.3 g) in tetrahydrofuran (100 ml) was added sodium methoxide solution (25% in methanol, 5 ml). The mixture was stirred at room temperature for 8 hours, then diluted with 50 ml of water. The mixture was extracted with ethyl acetate (100 ml). The ethyl acetate was separated and dried over magnesium sulfate. After the mixture was filtrated and concentrated, the residue was purified by a chromatography column (dichloromethane/methanol as eluent) to obtain 2.5 g of 4-((4-fluoro-3-chlorophenyl)amino)-7-methoxy-6-nitroquinazoline, MS (m/z): 348.72 (M+1)$^+$.

(4) Preparation of 4-((4-Fluoro-3-Chlorophenyl) Amino)-7-Methoxy-6-Aminoquinazoline To 4-((4-fluoro-3-chlorophenyl)amino)-7-methoxy-6-nitroquinazoline (3.3 g) in ethanol (150 ml) and water (8 ml), ammonium chloride (1.6 g) andiron powder (2.8 g) were added, and then the mixture was heated under reflux with stirring for 5 hours. The mixture was filtered and concentrated, and the obtained solid was further washed with 15 ml of water. After drying in high vacuum, the product 4-((4-fluoro-3-chlorophenyl)amino)-7-methoxy-6-aminoquinazoline (2.6 g) was obtained, MS (m/z): 318.74 (M+1)$^+$.

(5) Preparation of 4-((4-Fluoro-3-Chlorophenyl) Amino)-7-Methoxy-6-(N-Bromoacetyl) Aminoquinazoline To the mixture of 4-((4-fluoro-3-chlorophenyl)amino)-7-methoxy-6-aminoquinazoline (160 mg) and triethylamine (129 mg) in 50 ml of dichloromethane was added bromoacetyl bromide (120 mg) slowly at 0° C. After the mixture was stirred for 3 hours at this temperature, it was diluted with 10 ml of water. The dichloromethane was separated and dried over anhydrous magnesium sulfate. A crude product was obtained by filtering and concentration, and further purified by chromatography column to provide 4-((4-fluoro-3-chlorophenyl)amino)-7-methoxy-6-(N-bromoacetyl) aminoquinazoline (170 mg).

The representation of the prepared compound was: MS (m/z): 438.80 (M+1)$^+$.

The H NMR spectrum is as shown in FIG. 1.

H NMR (CD$_3$OD/DMSO-D$_6$): δ=8.92 (s, 1H), 8.55 (s, 1H), 8.12 (m, 1H), 7.79 (m, 1H), 7.38 (m, 1H), 7.30 (s, 1H), 4.28 (s, 2H), 4.06 (s, 3H).

In addition, in FIG. 1, δ=4.04 is a peak of H$_2$O, 3.13 is a peak of MeOH, and 2.60 is a peak of DMSO.

Example 2

The disclosed tyrosine kinase inhibitor in this example is 4-((4-fluoro-3-chlorophenyl)amino)-7-methoxy-6-(N-chloracetyl) aminoquinazoline, which can be prepared based on the following steps. In this example, R1 is methyl, R2 is F, R3 is Cl, Y is NH, X is Cl, and n=0 in formula (I).

The mixture of 4-((4-fluoro-3-chlorophenyl)amino)-7-methoxy-6-aminoquinazoline (160 mg) (e.g., as prepared in step (4) of Example 1) and triethylamine (120 mg) in dichloromethane (50 ml) was cooled to 0° C. Then chloroacetyl chloride (68 mg) was added dropwise. After the reaction mixture was stirred for 5 hours, diluted with water (10 ml). The dichloromethane was separated and dried over anhydrous magnesium sulfate. The mixture was filtered and concentrated, the residue was further purified by column to obtain the product 4-((4-fluoro-3-chlorophenyl)amino)-7-methoxy-6-(N-chloracetyl) aminoquinazoline (160 mg), MS (m/z): 394.68 (M+1).

Example 3

The disclosed tyrosine kinase inhibitor in this example is 4-((4-fluoro-3-chlorophenyl)amino)-7-methoxy-6-(N-3-chloropropanoyl)aminoquinazoline, which can be prepared based on the following steps. In this example, R1 is methyl, R2 is F, R3 is Cl, Y is NH, X is Cl, and n=2 in formula (I).

To the mixture of 4-((4-fluoro-3-chlorophenyl)amino)-7-methoxy-6-aminoquinazoline (160 mg)(e.g., as prepared in step (4) of Example 1) and of 4-dimethylaminopyridine (60 mg) in N,N-dimethylformamide (10 ml) were added 1-ethyl-3-(3-dimethylaminopropyl)carbodiimide hydrochloride (125 mg), 3-chloropropionic acid (70 mg) and N,N-diisopropylethylamine (129 mg). The mixture was stirred at rt for 15 hours, then diluted with water (20 ml). The mixture was extracted with ethyl acetate (100 ml), the ethyl acetate was separated and dried over magnesium sulfate. The mixture was filtrated and concentrated, and the residue was purified by chromatography column (dichloromethane/methanol as eluent) to obtain 55 mg of 4-((4-fluoro-3-chlorophenyl)amino)-7-methoxy-6-(N-3-chloropropanoyl)aminoquinazoline, MS (m/z): 408.68 (M+1)$^+$.

Example 4

The disclosed tyrosine kinase inhibitor in this example is 4-((4-fluoro-3-chlorophenyl)amino)-7-propargyloxy-6-(N-bromoacetyl)aminoquinazoline, which can be prepared based on the following steps. In this example, R1 is propargyl, R2 is F, R3 is Cl, Y is NH, X is Br, and n=0 in formula (I).

(1) Preparation of 4-((4-Fluoro-3-Chlorophenyl) Amino)-7-Propargyloxy-6-Nitroquinazoline To propargyl alcohol (6.0 g) in tetrahydrofuranm (300 ml), 4.3 g of sodium hydride was added portionwise, and the mixture was stirred at room temperature for 1 hour. Then 4-((4-fluoro-3-chlorophenyl)amino)-7-fluoro-6-nitroquinazoline (13.0 g) (e.g., as prepared in step (2) of Example 1) was added, and the mixture was stirred continuously at room temperature for 5 hours. Diluted with water (100 ml), then extracted with ethyl acetate (300 ml). The ethyl acetate was separated and dried over magnesium sulfate. The mixture was filtered and concentrated, 4-((4-fluoro-3-chlorophenyl)amino)-7-propargyloxy-6-nitroquinazoline (2.5 g) was obtained, MS (m/z): 372.75 (M+1)$^+$.

(2) Preparation of 4-((4-Fluoro-3-Chlorophenyl) Amino)-7-Propargyloxy-6-Aminoquinazoline To 4-((4-fluoro-3-chlorophenyl)amino)-7-propargyloxy-6-nitroquinazoline (10.0 g) in ethanol (250 ml) and water (18 ml), ammonium chloride (4.5 g) and iron powder (7.0 g) were added. Then the mixture was heated under reflux for 15 hours. The mixture was filtered and concentrated, and the obtained solid was further purified by chromatography column to obtain 4-((4-fluoro-3-chlorophenyl)amino)-7-propargyloxy-6-aminoquinazoline (7.6 g), MS (m/z): 342.76 (M+1)$^+$.

(3) Preparation of 4-((4-Fluoro-3-Chlorophenyl) Amino)-7-Propargyloxy-6-(N-Bromoacetyl) Aminoquinazoline The mixture of 4-((4-fluoro-3-chlorophenyl)amino)-7-propargyloxy-6-aminoquinazoline (343 mg) and triethylamine (258 mug) in dichloromethane (100 ml) was cooled to 0° C. Bromoacetyl bromide (220 mg) was added dropwise, and the mixture was stirred for 3 hours. Diluted with water (20 ml), and the dichloromethane was separated and dried over anhydrous magnesium sulfate. After filtering and concentration, the residue was further purified by chromatography column to obtain 4-((4-fluoro-3-chlorophenyl)amino)-7-propargyloxy-6-(N-bromoacetyl) aminoquinazoline (300 mg), MS (m/z): 462.69 (M+1)$^+$.

Example 5

The disclosed tyrosine kinase inhibitor in this example is 4-((4-fluoro-3-chlorophenyl)amino)-7-phenylol-6-(N-chloracetyl)aminoquinazoline, which can be prepared based on the following steps. In this example, R1 is phenyl, R2 is F, R3 is Cl, Y is NH, X is Cl, and n=0 in formula (I).

(1) Preparation of 4-((4-Fluoro-3-Chlorophenyl) Amino)-7-Phenylol-6-Nitroquinazoline To 4-((4-fluoro-3-chlorophenyl)amino)-7-fluoro-6-nitroquinazoline (2.0 g) (e.g., as prepared in step (2) of Example 1) in tetrahydrofuran (100 ml) was added sodium phenoxide (2.2 g), and the mixture was stirred at room temperature for 2 hours. Diluted with water (50 ml), then extracted with ethyl acetate (100 ml). The ethyl acetate was separated and dried over magnesium sulfate. The mixture was filtrated and concentrated, and the residues were purified by chromatographic column (dichloromethane/methanol as eluent) to obtain 1.5 g of 4-((4-fluoro-3-chlorophenyl)amino)-7-phenylol-6-nitroquinazoline, MS (m/z): 410.79 (M+1)$^+$.

(2) Preparation of 4-((4-Fluoro-3-Chlorophenyl) Amino)-7-Phenylol-6-Aminoquinazoline To 4-((4-fluoro-3-chlorophenyl)amino)-7-phenylol-6-nitroquinazoline (1.5 g) in ethanol (100 ml) and water (6 ml), ammonium chloride (2.0 g) and iron powder (2.8 g) were added, and then the mixture was heated under reflux with stirring for 5 hours. The mixture was filtered and concentrated, and the obtained solid was further washed with water (15 ml) and ether (20 ml), dried in high vacuum to obtain 1.0 g of 4-((4-fluoro-3-chlorophenyl)amino)-7-phenylol-6-aminoquinazoline, MS (m/z): 380.81 (M+1)$^+$.

(3) Preparation of 4-((4-Fluoro-3-Chlorophenyl) Amino)-7-Phenylol-6-(N-Chloracetyl) Aminoquinazoline To 4-((4-fluoro-3-chlorophenyl)amino)-7-phenylol-6-aminoquinazoline (160 mg) and triethylamine (129 mg) in dichloromethane (50 ml) was added chloroacetyl chloride (80 mg) dropwise at 0° C., and the mixture was stirred for 3 hours. Diluted with water (10 nil), and the dichloromethane was separated and dried over anhydrous magnesium sulfate. After filtering and concentration, the residue was further purified by column to obtain 150 mg of 4-((4-fluoro-3-chlorophenyl)amino)-7-phenylol-6-(N-chloracetyl) aminoquinazoline, MS (m/z): 456.74 (M+1)$^+$.

Example 6

The disclosed tyrosine kinase inhibitor in this example is 4-((3-ethynylphenyl)amino)-7-methoxy-6-(N-bromoacetyl) aminoquinazoline, which can be prepared based on the following steps. In this example, R1 is methyl, R2 is H, R3 is ethynyl, Y is NH, X is Br, and n=0 in formula (I).

(1) Preparation of 4-((3-Ethynylphenyl)Amino)-7-Fluoro-6-Nitroquinazoline

4-Chloro-7-fluoro-6-nitroquinazoline (2.3 g) (e.g., as prepared in step (1) of Example 1), 3-ethynylaniline (1.3 g) and potassium carbonate (1.7 g) were added to N,N-dimethylformamide (30 ml). The mixture was stirred at 50° C. for 10 hours. Then the solvent was distilled under reduced pressure. Ethyl acetate (100 ml) was added, the mixture was washed with 30 ml of water. Ethyl acetate was separated and dried over magnesium sulfate. After the mixture was filtrated and concentrated, the residue was purified by chromatography column (dichloromethane/methanol as eluent) to obtain 2.1 g of 4-((3-ethynylphenyl)amino)-7-fluoro-6-nitroquinazoline, MS (m/z): 308.68 (M+1)+.

(2) Preparation of 4-((3-Ethynylphenyl)Amino)-7-Methoxy-6-Nitroquinazoline

To 4-((3-ethynylphenyl)amino)-7-fluoro-6-nitroquinazoline (1.3 g) in tetrahydrofuran (100 ml) was added sodium methoxide solution (25% in methanol, 5 nil), and the mixture was stirred at room temperature for 8 hours. Diluted with water (50 ml), and extracted with ethyl acetate (100 ml). The ethyl acetate was separated and dried over magnesium sulfate. The mixture was filtrated and concentrated, and the residue were purified by chromatography column (dichloromethane/methanol as eluent) to obtain 0.8 g of 4-((3-ethynylphenyl)amino)-7-methoxy-6-nitroquinazoline, MS (m/z): 320.70 (M+1)$^+$.

(3) Preparation of 4-((3-Ethynylphenyl)Amino)-7-Methoxy-6-Aminoquinazoline

To 4-((3-ethynylphenyl)amino)-7-methoxy-6-nitroquinazoline (0.8 g) in ethanol (50 ml) and water (5 ml) were added ammonium chloride (0.6 g) and iron powder (1.1 g), and then the mixture was heated under reflux with stirring for 5 hours. The mixture was filtered and concentrated, the obtained solid was washed with water (10 ml) and dried in high vacuum to obtain 0.5 g of 4-((3-ethynylphenyl)amino)-7-methoxy-6-aminoquinazoline, MS (m/z): 290.80 (M+1)+.

(4) Preparation of 4-((3-Ethynylphenyl)Amino)-7-Methoxy-6-(N-Bromoacetyl) Aminoquinazoline The reaction mixture of 4-((3-ethynylphenyl)amino)-7-methoxy-6-aminoquinazoline (145 mg) and triethylamine (129 mg) in dichloromethane (50 ml) was cooled to 0° C. 120 mg of bromoacetyl bromide was added dropwise. The mixture was stirred for 3 hours, then diluted with water (10 ml). The dichloromethane was separated and dried over anhydrous magnesium sulfate. A crude product was obtained by filtering and concentration, and further purified by chromatography column to obtain 105 mg of 4-((3-ethynylphenyl)amino)-7-methoxy-6-(N-bromoacetyl)aminoquinazoline, MS (m/z): 410.84 (M+1)$^+$.

Experiment 1

Figure 2:
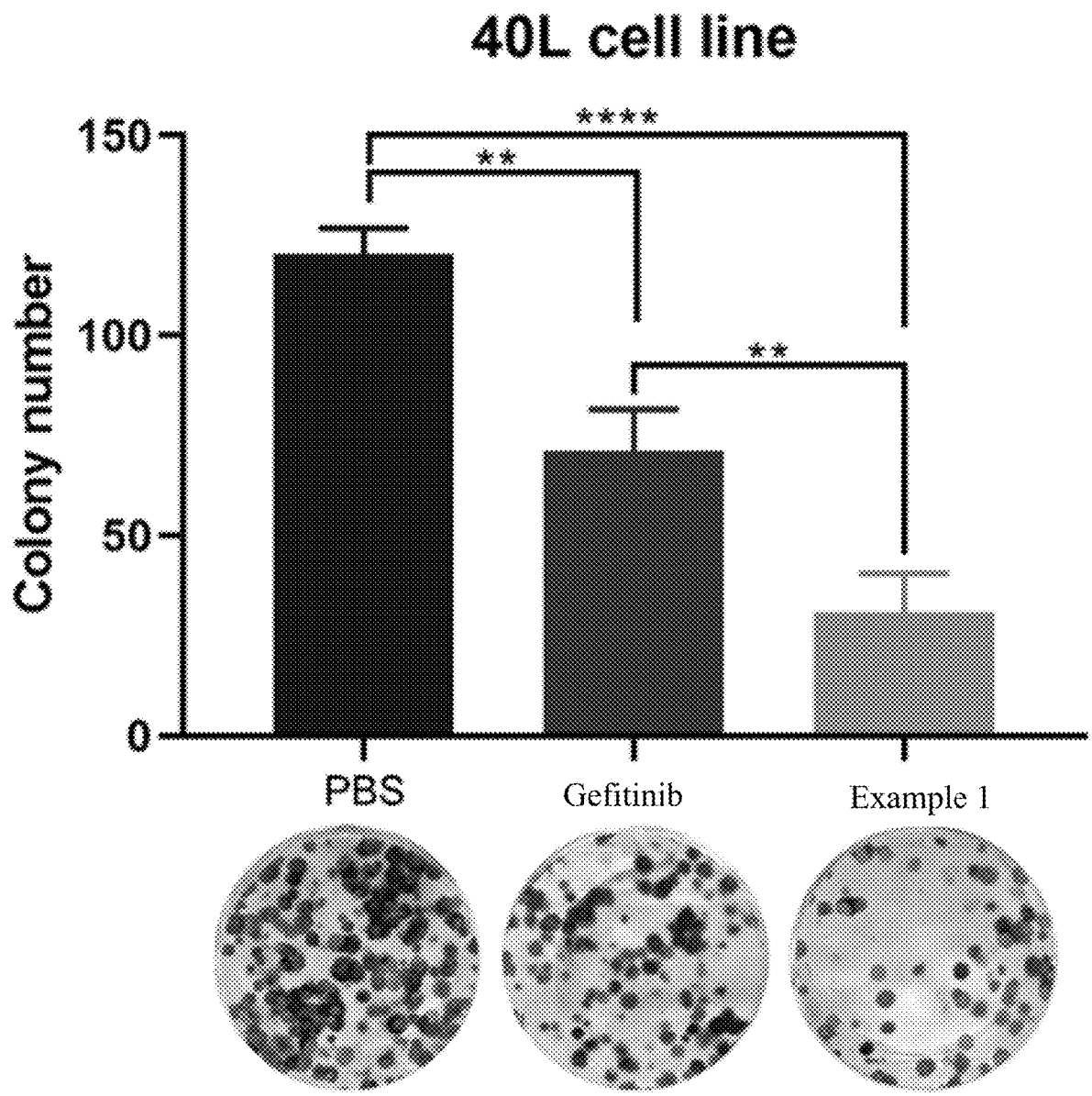
FIG. 2 shows a statistical graph of proliferation of 40 L of pretreated mesothelioma cells analyzed by plate cloning experiments.

Effects of the compound prepared in Example 1 and gefitinib were tested and compared. Experiment 1 included cell plate cloning experiments to detect cell proliferation.
1. Experimental Steps:
   (1) 30 μM of gefitinib was used to pretreat one group of 40 L of mesothelioma cell lines, 30 μM of the compound prepared in Example 1 were used to pretreat another group of 40 L of mesothelioma cell lines, and phosphate-buffered saline (PBS) was used as a blank control group;
   (2) The 40 L of cell lines in different treatment groups were collected; the cells were counted under a microscope, the cells were inoculated in a six-well plate by adjusting the number of cells to 200 cells/well (2 mL) with corresponding complete medium, and the cells were cultured in an incubator containing 5% CO2 at 37° C.;
   (3) Fresh complete medium was changed every 3 days;
   (4) After about 7-10 days of continuous culture, the culture medium was discarded, the cells were carefully washed with 1×PBS 3 times, and 1 mL of 4% paraformaldehyde was added to each culture dish to fix the cells for 30 minutes. The paraformaldehyde was discarded, and the cells were washed again with 1×PBS 3 times. The cells were stained with crystal violet at room temperature for 10 min, the staining solution was discarded, and the cells were washed with 1×PBS 3 times; and
   (5) the cells were pictured with a camera and counted for statistical analysis.
2. Experimental Results The effects of different compounds on the proliferation ability of the 40 L of cells were analyzed by plate cloning experiments. The experimental results after 10 days are shown in FIG. 2. As shown in FIG. 2,  denotes P<0.01, and ** denotes P<0.0001. The results demonstrates that the compound prepared in Example 1 has a significantly better ability in inhibiting the proliferation of tumor cells than gefitinib.

Those skilled in the art should understand that the modifications and variations of the various embodiments disclosed above can be made without departing from the essence of the invention. Therefore, the protection scope of the present disclosure should be defined by the appended claims.

Although different exemplary embodiments of the present disclosure have been described, it is obvious to those skilled in the art that various changes and modifications can be made, which can achieve some of the advantages of the present disclosure without departing from the spirit and scope of the present disclosure. For those who are quite skilled in the art, other components performing the same function can be replaced as appropriate. It should be mentioned that the features explained here with reference to particular figures can be combined with features of other figures, even in those cases where this is not explicitly mentioned. In addition, the method of the present disclosure can be implemented either in all software implementations using appropriate processor instructions or in a hybrid implementation using a combination of hardware logic and software logic to achieve the same result. Such modifications to the solution according to the invention are intended to be covered by the appended claims.

What is claimed is:
1. A tyrosine kinase inhibitor (TKI), having the following formula (I):

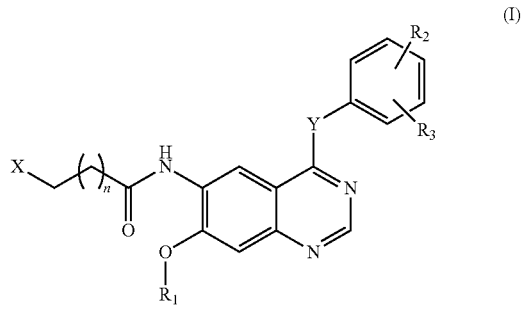

wherein:

R1 is alkenyl, substituted alkenyl, alkynyl, substituted alkynyl, phenyl, mono-substituted phenyl, poly-substituted phenyl, trifluoromethyl, 2,2,2-trifluoroethyl, $CH_3O(CH_2)_K$—,

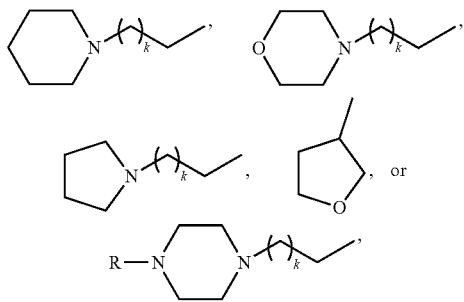

R being methyl, ethyl, isopropyl, trifluoromethyl, 2,2,2-trifluoroethyl, cyclopropyl, acetyl or acryloyl;

R2 is halogen, hydrogen, amino, substituted amino, cyano, hydroxyl, sulfonic acid group, sulfonamide, trifluoromethyl, 2,2,2-trifluoroethyl, methyl, methoxy or ethynyl;

R3 is halogen, hydrogen, amino, substituted amino, cyano, hydroxyl, sulfonic acid group, sulfonamide, trifluoromethyl, 2,2,2-trifluoroethyl, methyl, methoxy or ethynyl;

R2 and R3 are in an ortho, para or meta position;

Y is NH, O, S or Z—N, wherein Z is methyl, ethyl, isopropyl, trifluoromethyl, 2,2,2-trifluoroethyl or cyclopropyl; and X is Cl, Br or F, n and k each being an integer from 0 to 6.

2. A pharmaceutical composition, including: a TKI as shown in the formula (I) according to claim 1 as an active ingredient, and one or more pharmaceutical carriers or excipients.

3. The TKI according to claim 1, wherein:
when X is Cl or F, n is an integer from 0 to 6; when X is Br, n is 0 or an integer from 2 to 6.

4. The TKI according to claim 1, wherein X is Cl or F.

* * * * *